United States Patent
Dipnall

[19]

[11] Patent Number: 5,937,644
[45] Date of Patent: Aug. 17, 1999

[54] DEVICE FOR EXTRACTING ENERGY FROM MOVING FLUID

[76] Inventor: David John Joseph Dipnall, 26 Jamieson Court, Cape Schanck, Victoria 3939, Australia

[21] Appl. No.: 08/913,101

[22] PCT Filed: Mar. 8, 1996

[86] PCT No.: PCT/AU96/00127

§ 371 Date: Sep. 8, 1997

§ 102(e) Date: Sep. 8, 1997

[87] PCT Pub. No.: WO96/28657

PCT Pub. Date: Sep. 19, 1996

[30] Foreign Application Priority Data

Mar. 10, 1995 [AU] Australia .................................. PN1637

[51] Int. Cl.⁶ .................................................. F16D 31/02
[52] U.S. Cl. ........................... 60/398; 416/228; 416/237; 416/240; 416/242
[58] Field of Search ......................... 60/398; 416/209 R, 416/223 R, 228, 235, 237, 240, 242

[56] References Cited

U.S. PATENT DOCUMENTS

| | | |
|---|---|---|
| 4,086,023 | 4/1978 | Morgan . |
| 4,093,402 | 6/1978 | Van Holten . |
| 4,324,530 | 4/1982 | Fradenburgh et al. ............. 416/237 X |
| 4,662,823 | 5/1987 | Cooke ................................. 416/235 X |
| 4,801,242 | 1/1989 | Eunbong ............................. 416/237 X |
| 5,067,410 | 11/1991 | Murnane, III et al. ................. 416/240 |

FOREIGN PATENT DOCUMENTS

| | | |
|---|---|---|
| 2291381 | 6/1976 | France . |
| 2303967 | 10/1976 | France . |
| 6213136 | 8/1994 | Japan . |
| 2169663 | 7/1986 | United Kingdom . |
| WO82/04289 | 12/1982 | WIPO . |
| WO87/04400 | 7/1987 | WIPO . |
| WO91/12429 | 8/1991 | WIPO . |
| WO94/10029 | 5/1994 | WIPO . |

OTHER PUBLICATIONS

Derwent Abstract Accession No. 93–051894/06, Class Q 51 Q 55, SU 1719710A Mar. 15, 1992.
Patent Abstract of Japan M 1699 p. 1, Jul. 6, 1992.

*Primary Examiner*—Hoang Nguyen
*Attorney, Agent, or Firm*—Mayer, Brown & Platt

[57] ABSTRACT

An energy conversion apparatus for extracting useful energy from moving fluids such as water, the apparatus including a shaft and a plurality of integrally formed blade modules which are coupled together to form the shaft, a plurality of blades is integrally formed on the free ends of arms, the arrangement being such that the blades can be resiliently displaced relative to the arms when located in the moving fluid to thereby produce useful torque on the shaft.

18 Claims, 8 Drawing Sheets

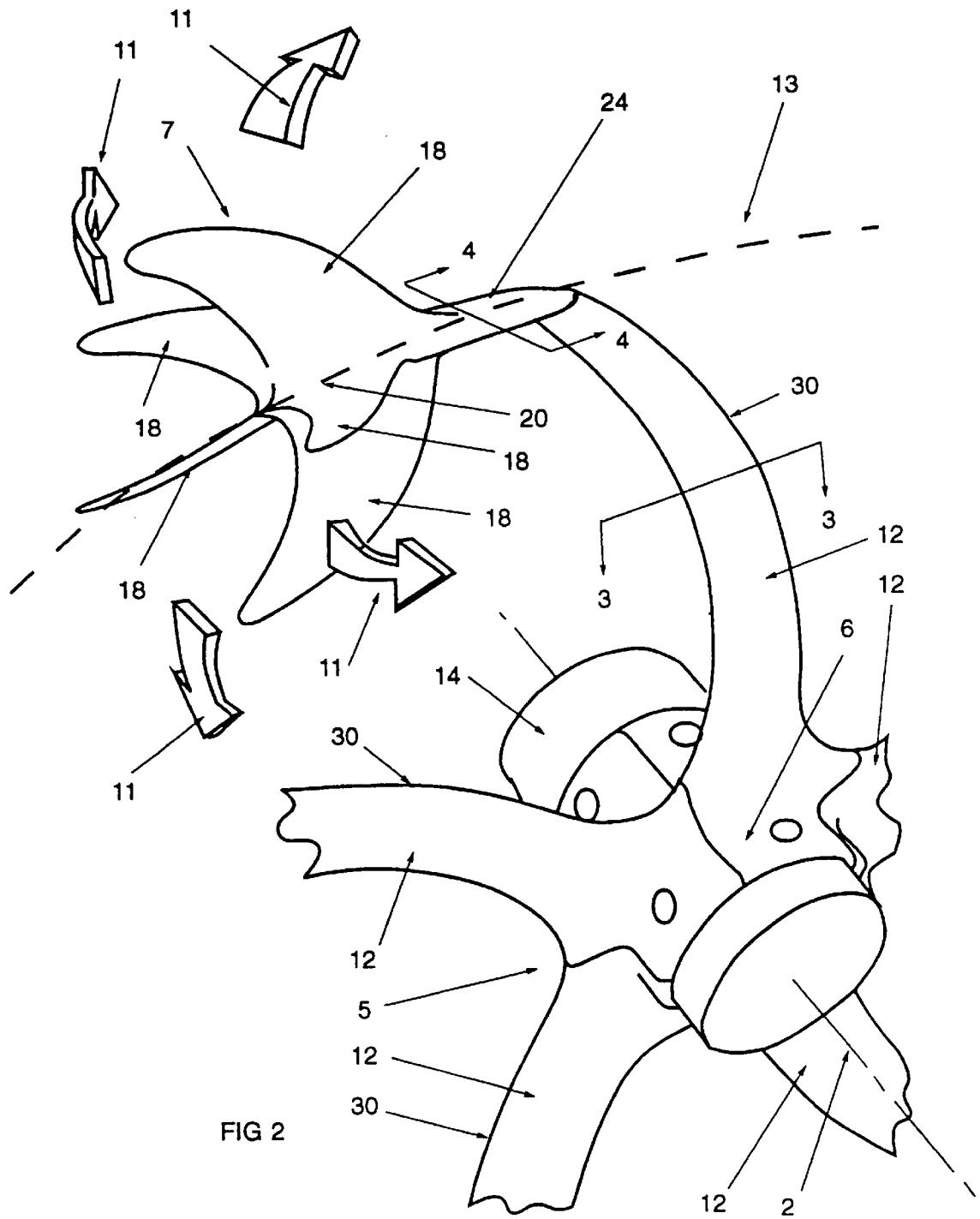
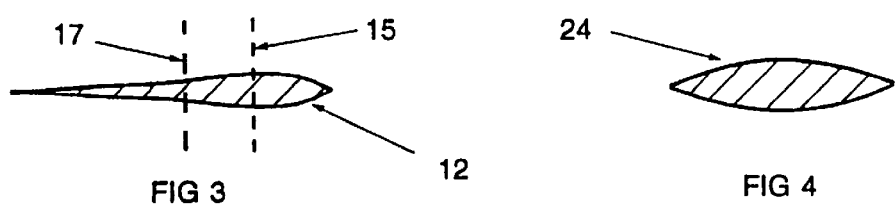
FIG 2
FIG 3
FIG 4

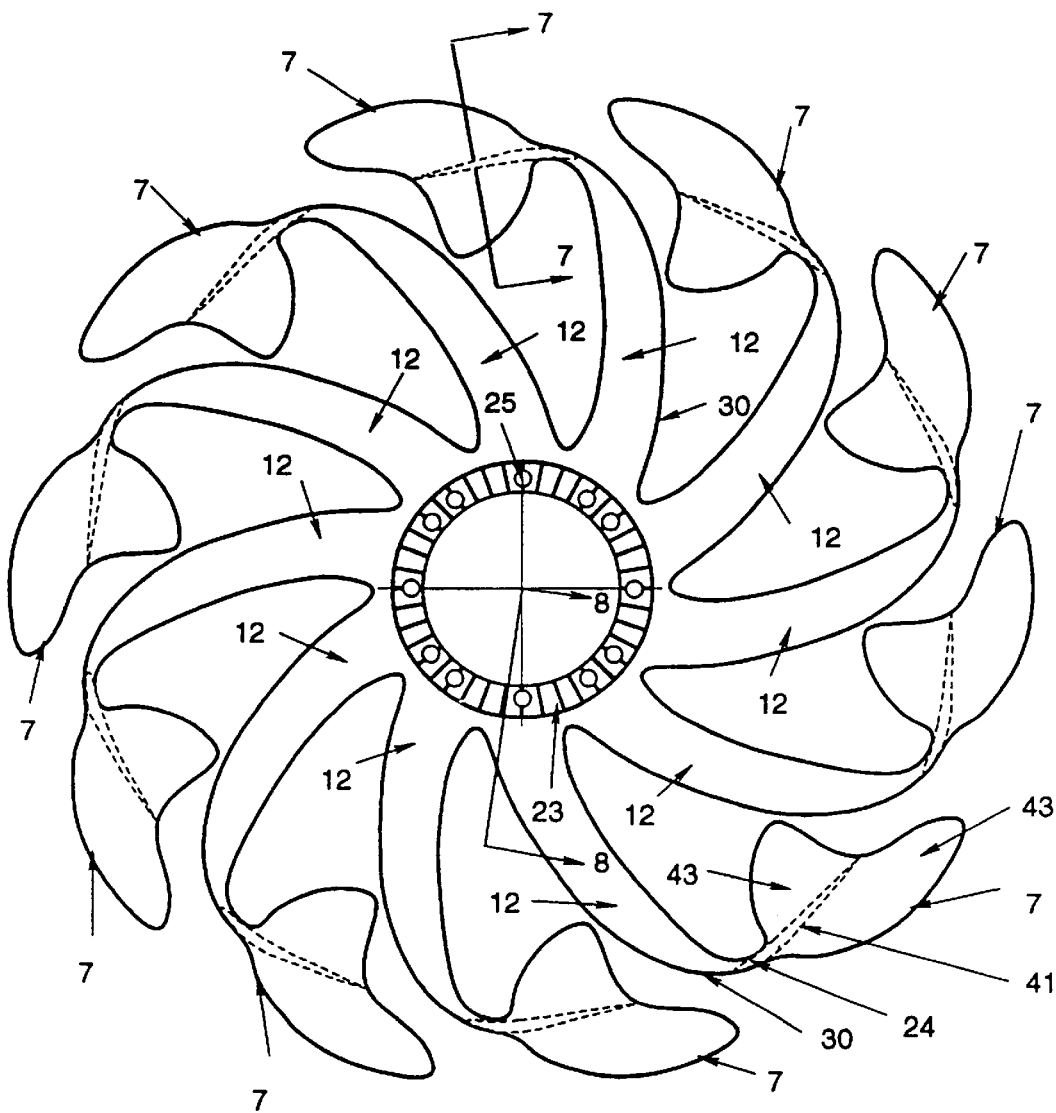
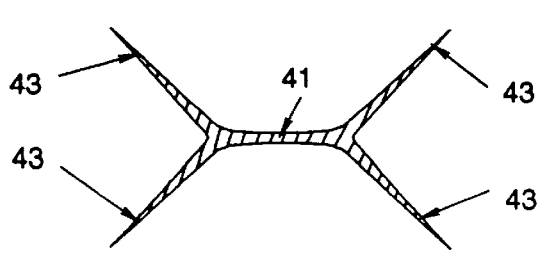
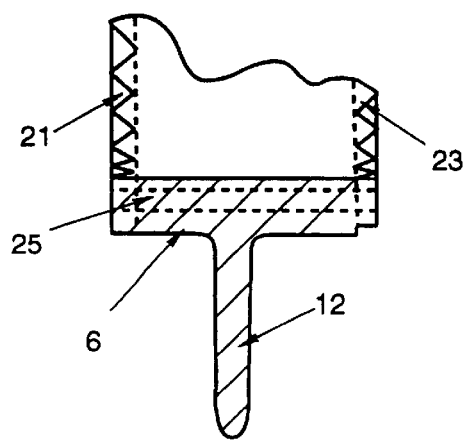
FIG 6
FIG 7
FIG 8

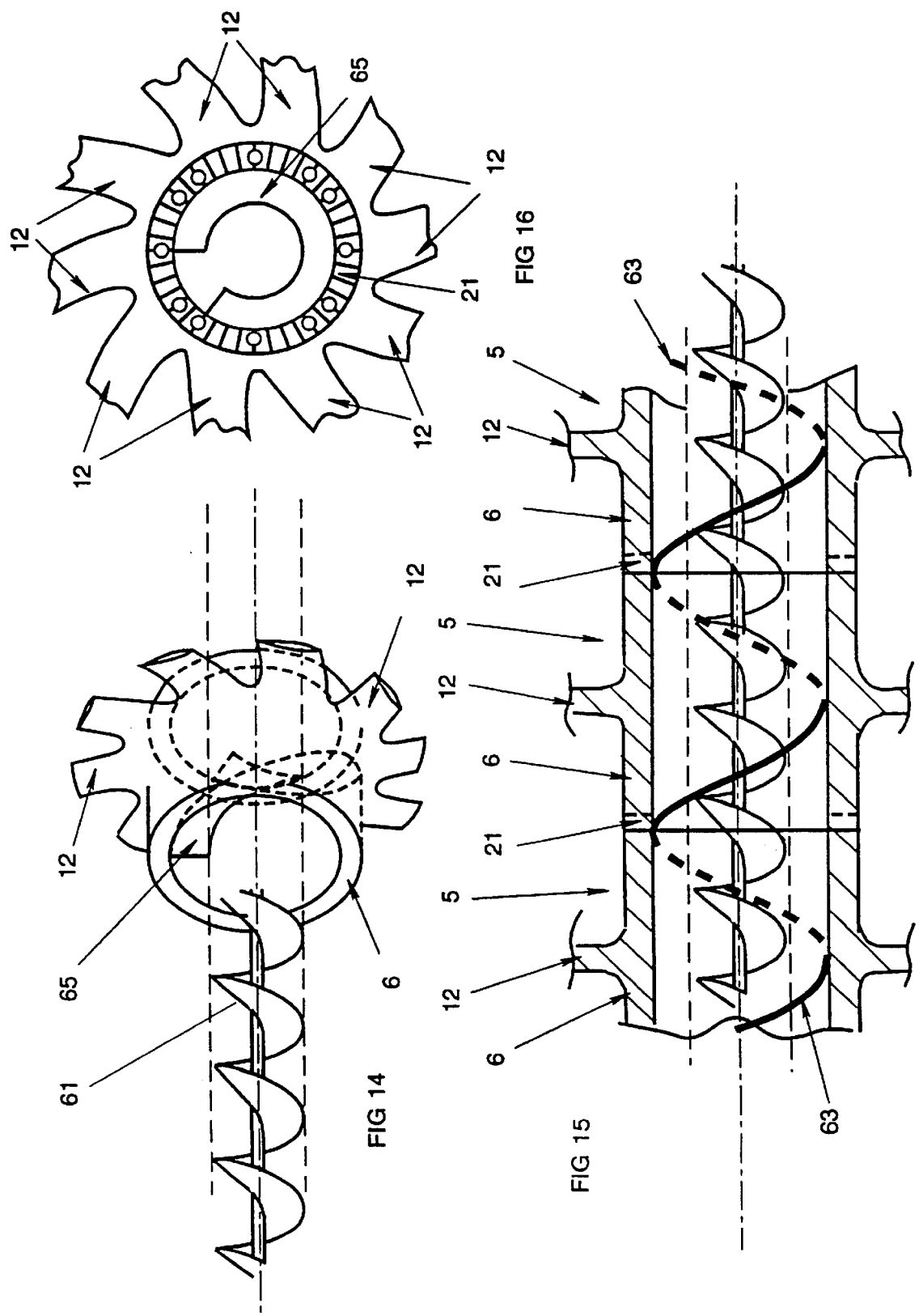

DEVICE FOR EXTRACTING ENERGY FROM MOVING FLUID

This is a continuation of application Ser. No. 08/712,068 filed on Sep. 11, 1996, now U.S. Pat. No. 5,713,659; which is a continuation of Ser. No. 80/532,405 filed on Sep. 22, 1995; which is a continuation of Ser. No. 08/341,678 filed on Nov. 17, 1994 (U.S. Pat. No. 5,537,302); which is a continuation of Ser. No. 07/996,103 filed on Dec. 23, 1992 (U.S. Pat. No. 5,381,324).

The present invention relates to a device for extracting energy from moving water, air or any other fluid or gaseous medium and in particular, to a device for extracting energy from waves, lateral tide flow, river flow, wind, or a combination of any of these so as to drive turbines and power generators etc.

Numerous devices have previously been developed for extracting energy from the previously mentioned sources. Some examples include simple water wheels, propellers used as turbines, Pelton turbines, Kaplan turbines, Francis turbines and cross-flow turbines. All of these devices fall into one of three categories—they are either radial, axial, or cross-flow turbines. As such, they constitute various solutions to extracting energy from various sources. However, in environments having uneven flow characteristics, such as would be found in wave environments, turbulent river or tidal flows, or turbulent air flows resulting from uneven surrounding contours of ground or local obstructions, such devices are not particularly efficient. This is because such devices are unable to extract energy from any vector of particle velocity flow that is not co-axial or co-planar with the designed axis or plane of operation, or when the velocity of particles in zones of turbulence falls below that required to input energy to the turbine. In wave environments this is a particular disadvantage because a large percentage of the water particles will either not impact on the working surfaces of the devices or will not impact in the desired direction and thus the kinetic energy of such particles is wasted. Accordingly, it can readily be appreciated that devices designed to be responsive to particle movement in only one vector flow direction will only extract a small proportion of the energy of any wave. This means that there is a large proportion of a wave's energy that is not captured by such devices and is consequently lost. Due to this limitation devices of the type described in prior patents such as U.S. Pat. No. 2,021,815, U.S. Pat. No. 2,367,765, are relatively inefficient and have not proved to be very successful.

International Publication No. WO 87/04401 discloses a wave energy device which utilises aero-foil or hydrofoil elements which are arranged to rotate a rotor. It is recognised in this specification that the flow direction is not always constant and reference is made to harnessing of energy from shore waves where the direction of flow is reversed. An arrangement is proposed which can operate in regions of forward and reverse flow. The devices disclosed in that specification however cannot properly utilise those components of flow which are perpendicular to the axis of rotation of the rotor.

The present invention seeks to provide an efficient and improved device for extracting the kinetic energy contained in moving fluid or gas, particularly when such movement contains irregularities of velocity and direction. More particularly, a preferred arrangement of the present invention seeks to capture a high percentage of the kinetic energy contained in the proportion of fluid or gas movement which is unpredictable in both velocity and direction, and convert that energy to a uniform rotational form, via, for example, a shaft or common central axis so as to drive a power generator, pump or other device.

Australian Provisional Patent Application Nos. PL5603/92 and PL8677/93 describe novel blade assemblies which have resultant forces produced thereon when placed in flows of fluid, particularly turbulent flows such as those experienced in wave motion. The resultant forces can be used to produce force for propulsion of a vessel or the like or for the purpose of power generation. The invention described herein utilises an improved form of the blade assemblies disclosed in those patent applications and is primarily concerned with improvements and enhancements which enable more efficient power generating devices to be made.

According to a first aspect of the invention there is provided an energy conversion apparatus comprising:
   a shaft;
   means for mounting the shaft for rotation about an axis;
   an arm assembly being formed with or coupled to said shaft; and
   a plurality of blades being formed with or coupled to the free ends of said arms;
   The arrangement being such that the blades can be resiliently displaced relative to the arms when located in a moving fluid whereby the blades have components of force acting thereon which tend to produce rotation of said shaft.

According to the present invention there is also provided a device for extracting energy from moving particles so as to drive a rotor or other apparatus, said device comprising a blade array comprising a plurality of blades which extend about a real or imaginary central axis, said plurality of blades being attached to an arm means connected to said rotor and being arranged to move in response to forces applied by said moving particles, and means for harnessing a reactive force generated in response to the movement of said plurality of blades so as to enable at least a proportion of the reactive force to drive said plurality of blades along a predetermined path and thereby drive said rotor.

According to a first embodiment of the invention, said blade array is formed as an integral extension of the arm means. The arm means is arranged to be connected to a central shaft or common axis and the means for harnessing said reactive force is provided by the flexing characteristics of the arm means in one plane and the flexing characteristics of a section of the device located between said blade array and said arm means in another plane. The combination of these two planes of deflection enable deflection in all directions other than circumferentially about the central shaft or common axis.

The integrated blade array and arm means is preferably moulded in a flexible thermoplastic with good "spring" (memory) characteristics, such that a desired deflection can be achieved within the operational envelope. This operational envelope requires that the plurality of blades is able to be initially deflected with a low component of lateral pressure differential, with increasing lateral pressure producing increasing deflection up to a point where the return forces produced within the blade array connection and/or arm means are sufficient to prevent further deflection. This condition must be at a point within the elastic limits of the material.

The operational envelope parameters will differ according to the size and application of the device, and will accordingly require that differing materials or cross-sections be employed to suit each individual set of requirements which are dictated by the conditions of the intended operating environment. Some of the factors involved are:

(i) lateral areas of blades and arms;
(ii) mass and particle speed range of operating environment;
(iii) speed/torque resistance of the rotor system;
(iv) modulus of elasticity of the material of construction; and
(v) strength of the material of construction.

Preferably, a series of arm means and blade arrays are connected to said rotor. The arm means preferably extends radially from the rotor and adopts a progressive swept back configuration.

The arm means preferably comprises a radial arm shaped so that the maximum thickness of a cross-section of the arm is forward of the centre of lateral resistance of the arm at that point.

According to the present invention there is also provided a device for extracting energy from moving fluid so as to drive a rotor or other apparatus, said device comprising a blade array comprising a plurality of thrust producing blades disposed about an axis, said plurality of thrust producing blades being attached to an arm means which is also of thrust producing in cross-section.

Thrust producing describes any section wherein the maximum thickness of a hydro-foil or aero-foil shape is forward of the point of lateral resistance, as opposed to a non-thrust producing section which may be symmetrical about the point of lateral resistance.

Preferably, the arm means is connected to a rotor mounted for rotation on said axis such that any forward force resulting from lateral flow over either or both the blade array or the arm means will have components which are tangential to the rotor axis causing a torque force to be available from the rotor, to be used to generate electrical power or to energise pumping systems.

The arm means may comprise a plurality of individual arms which are connected to the rotor or are connected to hub elements which in turn are connected to the rotor. Alternatively, the arms may be produced integrally with the hub elements as a blade module and a plurality of these modules may be interconnected to form the rotor. In any of these arrangements, the blade assemblies may also be integrally formed with the module. Longitudinal tension wires or rods or the like can be used to apply tensile forces to the modules to fix the modules together to form the rotor. Preferably further, end fittings are provided to which bearings or power take off components or the like can be connected.

Embodiments of the invention will now be described by way of example only with reference to the accompanying drawings in which:

FIG. 2 is a fragmentary perspective view of an alternative embodiment of the invention;

FIG. 3 is a cross-section along the line 3—3;

FIG. 4 is cross-section along the line 4—4;

FIG. 6 is an end view of a modular blade module of the invention;

FIG. 7 is a sectional view along the line 7—7;

FIG. 8 is a sectional view along the line 8—8;

FIG. 14 is a fragmentary schematic view showing an alternative pump of the invention;

FIG. 15 is a fragmentary sectional view showing the alternative pump of the invention; and FIG. 16 is an end view of part of the pump shown in FIGS. 14 and 15.

Figure 1:
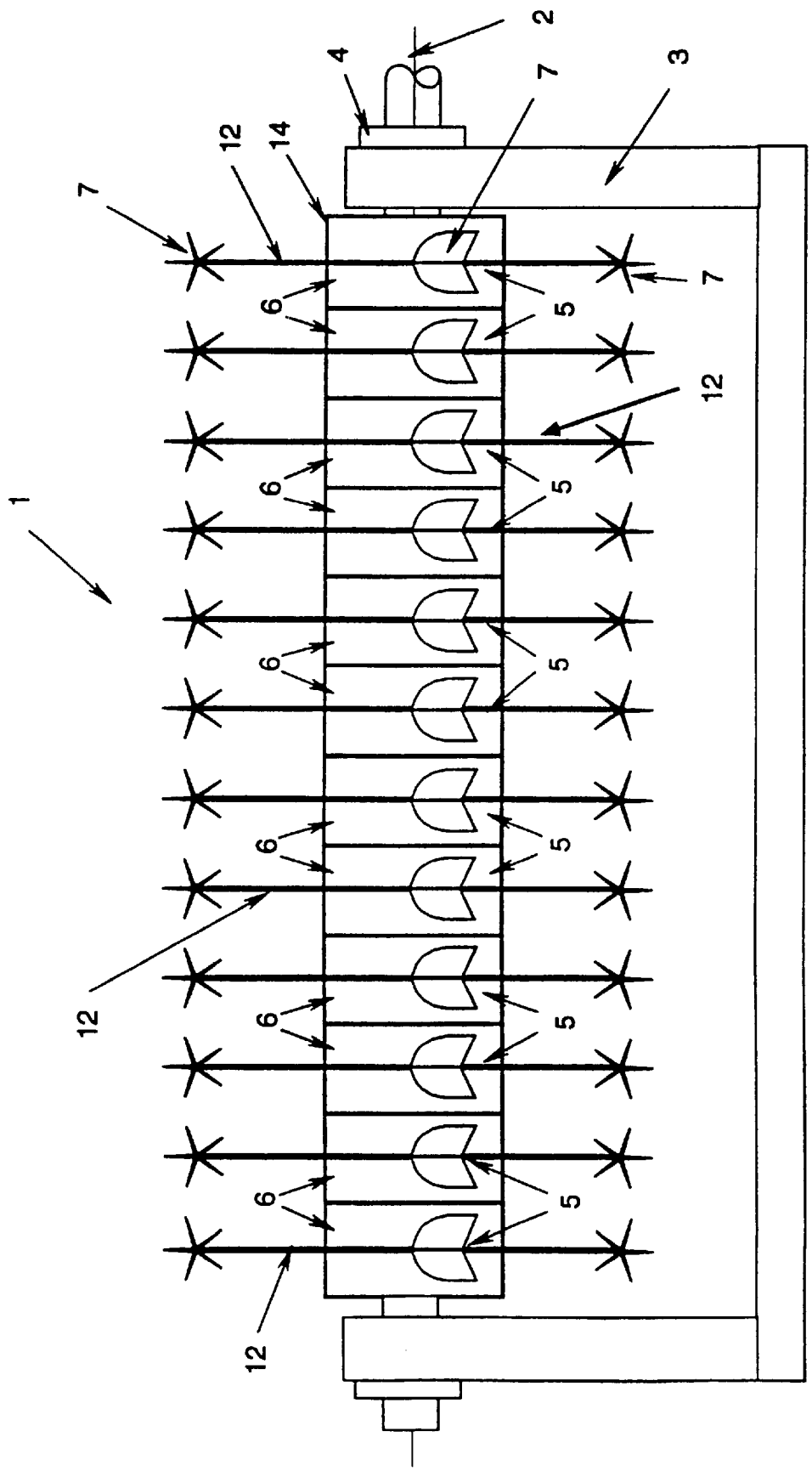
FIG. 1 is a schematic side view of a turbine which incorporates a plurality of arm assemblies constructed in accordance with the invention.

FIG. 1 diagrammatically illustrates a fluid flow turbine 1 of the invention. It comprises a rotor 14 which is mounted for rotation about an axis 2. The turbine is mounted on a framework 3 which includes bearing assemblies 4 which support the rotor 14 for rotation about the axis 2. In use the turbine is mounted in a region where there is laminar or turbulent flow of water (or other moving fluid such as air), the framework 3 being fixed to a stationary surface such as a mounting platform or the like. The arrangement is such that when the turbine 1 is subjected to laminar or turbulent flow, the rotor 14 will rotate as will hereinafter be described and useful mechanical power can be derived from the rotor 14. Typically, the rotor 14 may be coupled to a generator (not shown) or the like or to a pump. In some embodiments the pump or the generator may be internally built into the interior of the rotor 14, as will be described below.

The turbine 1 includes a plurality of blade modules 5. In the arrangement illustrated in FIG. 1, a plurality of the blade modules 5 are coupled together so as to form the rotor 14. Each blade module 5 comprises a hub element 6 from which radiate a plurality of arms 12. Located on the end of each arm 12 is a blade array 7.

As will be described in more detail below, the blade module 5 can be formed by integrally moulding the hub element 6 with the arms 12 and blade arrays 7. Alternatively, the blade module 5 can be fabricated from separate components such as individual hub elements, arms 12 and blade arrays 7. Alternatively, the blade arrays 7 may be integrally formed with the arms 12 and these can be individually coupled to separate hub elements 6.

The hub elements 6 may themselves form the rotor 14. In an alternative arrangement, the hub elements 6 may be mounted upon an elongate shaft (not shown) which is mounted for rotation on the axis 2.

The blade arrays 7 can be of the form disclosed in Australian Patent Application Nos. PL5603/92 and PL8677/93. As described in those patent applications, those blade assemblies have produced thereon a useful resultant force when the blade assemblies are mounted in flowing fluid, particularly in turbulent flows associated with wave motion, whether wind or ground contour induced.

FIG. 2 illustrates somewhat schematically a perspective view of a blade module 5 for use in extracting energy from moving water. The blade module 5 includes five arms 12, each of which is connected to a hub element 6. The hub elements are connected to or form the rotor 14. The blade module 5 rotates about the axis 2 and each blade array 7 moves in a circular path 13. The number of arms can be varied but preferably is more than three.

The blade array 7 includes a plurality of semi-rigid blades 18 which are of generally planar shape and are interconnected along a common inner edge 20 so that the blades 18 combine to form blade array 7. In the illustrated arrangement, there are five blades 18 in each blade array 7. The blades 18 are integrally moulded with one another. When the blade array 7 is in its at rest position, the inner edge 20 of each of the blades 18 is located on the path 13 which is circumferential about the axis 2 of the rotor 14. Each blade 18 preferably has an aero-foil shape in cross-section typically similar to the section shown in FIG. 3 and preferably more elongate.

Each blade array 7 is connected to its arm 12 by a flexible joint 24, which may be integrally moulded as illustrated in FIG. 2. The joint 24 permits deflection in two planes as diagrammatically illustrated by arrows 11. Lateral bending of the blades, that is to say about axes which are perpendicular to the central axis 2 and also by twisting movement of the arms 12, can additionally result in producing useful torque on the rotor 14. The bending and twisting of the arms can directly produce useful torque and can indirectly increase the torque produced by the blade arrays 7 by improving the angle of inclination of the blades relative to the fluid flow. Accordingly, it is preferred that the arms 12 and the joint 24 are moulded from semi-rigid plastics material which is capable of significant resilient flexure. The blade array 7 is connected to the joint 24 at a point forward of the centre of lateral resistance thereof. It will also be noted that the arms 12 are swept backwards relative to the direction of rotation of the rotor 14 (which is clockwise as shown in FIG. 2).

When the turbine 1 is mounted in a zone of moving fluid, (e.g. in a wave environment) fluid streams moving noncoaxially along the path 13 will have their flow line deflected by the surfaces of the blades 18. As a result of the lateral forces imposed by such deflection, the blade array 7 is caused to deflect away from its "at rest" position. The amount of deflection of the blade array 7 will vary depending on the flow velocity and direction of the flow and the spring or return force of the flexible joint 24. Fluid striking the blades 18 will be caused to move rearwardly along the surface of the blades 18 until it passes the blades 18 and then resumes unrestrained movement.

As a result of flow characteristics over the blades 18 causing the blade array 7 to deflect away from the at rest position, a component of thrust is generated and is transferred via the flexible joint 24 to the arm 12 which causes the arm 12 to rotate and thus drive the rotor 14.

The spring force which tends to return the blades 18 to the central at rest position is stored as potential energy in the flexible joint 24, and additionally in the arm 12, if the arm is designed to flex as well as the blade array 7 in response to flow which is not generally co-planar with the sides of the arm 12. This spring force is released when the deflection force from the fluid flow lessens and thereby the blades 18 and the arm 12 (if also deflected) returns to the central at rest position. Any such movement of the blades 18 and the arm 12 (if also deflected) causes a further deflection of rearwardly moving fluid over the blades 18 and the arm 12, thereby causing a further thrust force to be transferred to the rotor 14 via the arm 12.

As can be determined from mathematical analysis, the stronger the return force of the flexible joint 24, the smaller the thrust applied to the arms 12 and the faster the potential rotation of the arms 12 and rotor 14. In contrast, if the flexible joint 24 exhibits a weak return force, the thrust applied to the arms 12 is greater, but the potential speed of rotation of the rotor 14 is decreased.

In the arrangement illustrated in FIG. 2, the joint 24 is integrally moulded with the blade array 7 and the free end of the arm 12. In an alternative arrangement, a coil spring configuration could be utilised similar to that disclosed in the aforementioned Australian patent applications. Alternatively, hydraulic and/or mechanical spring tension adjustment mechanisms could be provided to alter the return force characteristics of the joint 24. This would enable the thrust and/or speed of the rotor 14 to be regulated.

The turbine of the invention has the advantage that torque be produced not only by the blades 18 but also by the arms 12. This of course improves the overall efficiency of the turbine. The contribution of the arms 12 can be enhanced in a number of ways. First, the arms 12 can be made flexible. Second, the arms can have an aero-foil cross-sectional configuration which itself will produce thrust as in a Wells type turbine. Third, the arms can be swept backwards.

The effect of flexure of the arms 12 has been described above. With regard to the aero-foil shape of the arms, a typical profile of cross-sectional is shown in FIG. 3. It will be noted that the point 15 of maximum thickness is forward of the centre 17 of lateral resistance. FIG. 4 shows the preferred cross-sectional configuration of the flexible joint 24. This is a symmetric configuration of greatest width than depth so as to permit flexure in the direction of its minor axis and to resist flexure in the direction of its major axis in order to transfer movement in the direction of its major axis to the arm 12 causing twisting of that component.

As best seen in FIGS. 2 and 6, the leading edge of the arms 12 when viewed axially relative to the rotor 14, have a swept back or cutlass shape. When arms of this shape are subjected to lateral fluid flows, both twisting and bending will occur which tends to improve the incidence angle of flow over the arms. This causes an improvement of the lift/drag ratio and contributes to the torque input to the rotor 14 caused by the arms. Second, the swept back shape of the arms 12 tends to resist fouling by weed or other foreign material by moving the weed or foreign material out and away from the rotor 14.

The leading edges of the blades 18 are also swept back so as to tend to move weed or foreign material away from the rotor 14.

FIGS. 5 to 8 illustrate in more detail a turbine constructed in accordance with the invention. In these drawings most of the arms 12 have been omitted for clarity of illustration. In this arrangement, there is a plurality of blade modules 5, each of which is integrally moulded from plastics material and has the configuration as shown in FIG. 6. It will be noted that there are ten arms 12, each of which is swept backwardly and formed integrally with the blade array 7. The blade array 7 may have an asymmetric profile as viewed axially, as seen in FIG. 6. The inner blades are smaller because there is less space available between the adjacent arms 12 than is available to the outboard blades 18.

Each of the hub elements 6 is preferably formed with internal and external castellations 21 and 23' on its axial faces. The arrangement is such that when adjacent blade modules 5 are axially aligned, the castellations 21 and 23 interlock with one another so as to inhibit any relative rotation between the modules 5. The hub elements 6 may be provided with bolt holes 25 through which long tension bolts 27 can be placed. The rotor 14 includes end pieces 29 and 31 also having bolt holes 33 for receipt of the bolts 27. The end pieces 29 and 31 may include shaft elements 34 which cooperate with the bearing assemblies 4. The end piece 29 also includes a spline 35 for coupling to a drive shaft for a generator, pump or the like. In use the tension bolts are tightened so as to firmly couple all of the modules 5 between the end pieces 29 and 31 so that the rotor 14 forms a rigid, robust unit.

Figure 5:
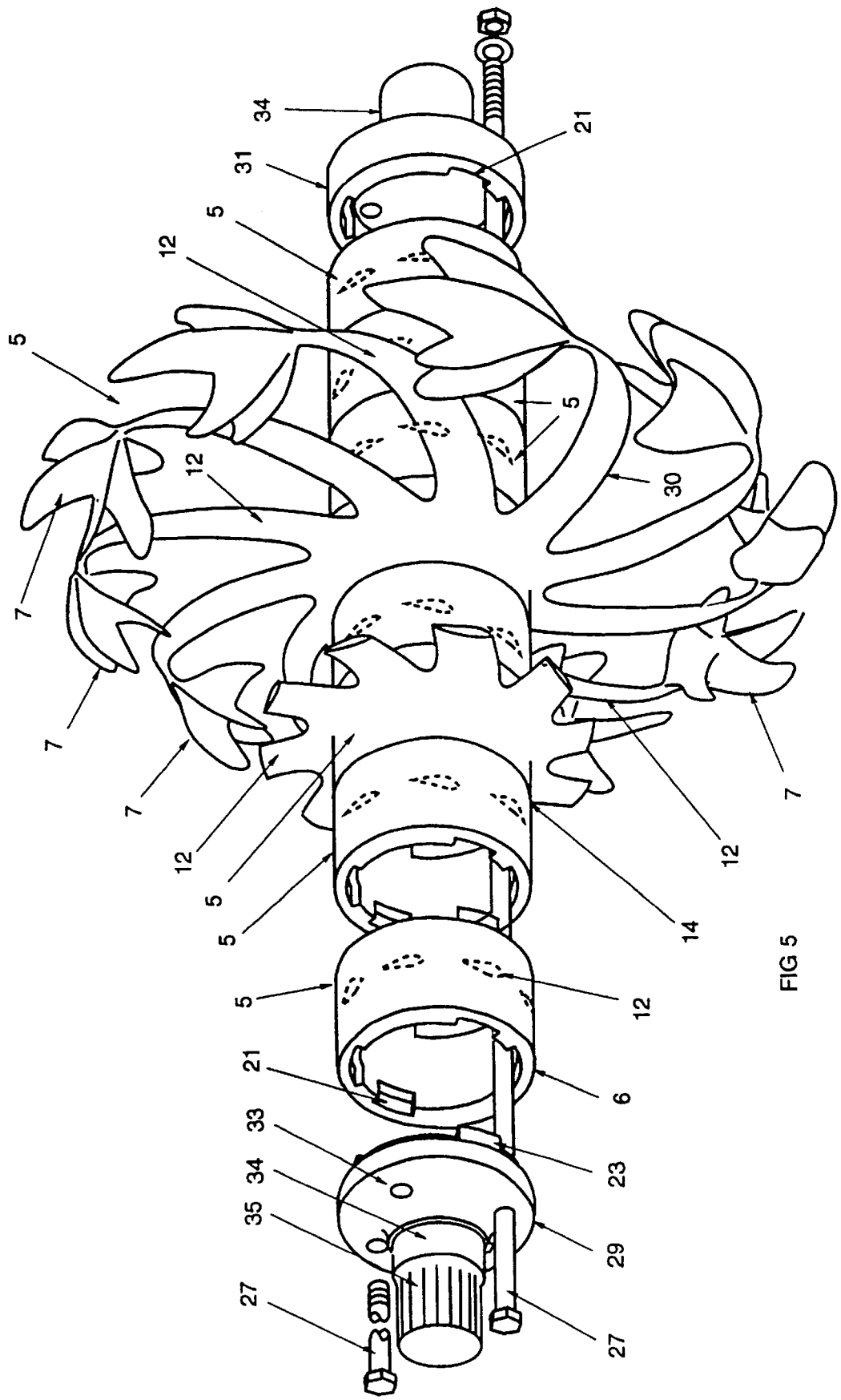
FIG. 5 is a fragmentary exploded view of an alternative embodiment of the invention.

As seen in FIG. 5, it is preferred that the arrangement of the modules 5 is such that the arms of adjacent modules are out of phase with one another. This increases the maximum working volume which is available to the blade arrays 7. The anti-phase orientation of the modules 5 can be selected when assembling the rotor 14 or may be dictated by the configuration of the castellations 21 and 23.

The blade module 5 shown in FIG. 6, has a blade array 7 as shown in section in FIG. 7. In this arrangement, there are five blades, comprising a central blade 41 which is disposed generally circumferentially relative to the rotor 14 and is joined with the flexible joint 24. The array 7 includes obliquely projecting blades 43 arranged in pairs at the side edges of the central blade 41. Each of the blades 43 preferably has a transverse section as shown in FIG. 3 so as to improve its hydrodynamic performance, as described above.

Figure 9:
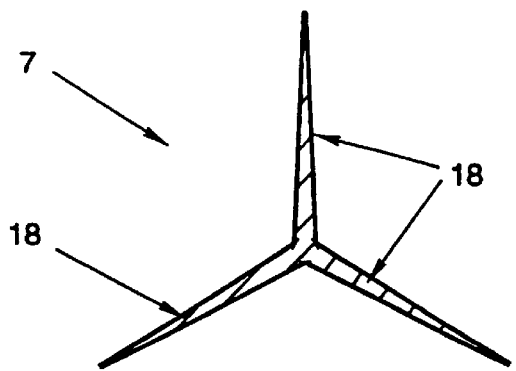
FIGS. 9, 10 and 11 are sectional views through alternative blade arrays of the invention.
Figure 10:
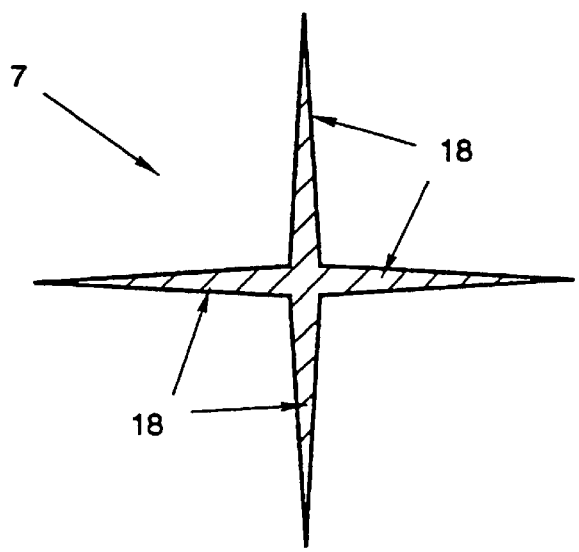
Figure 11:
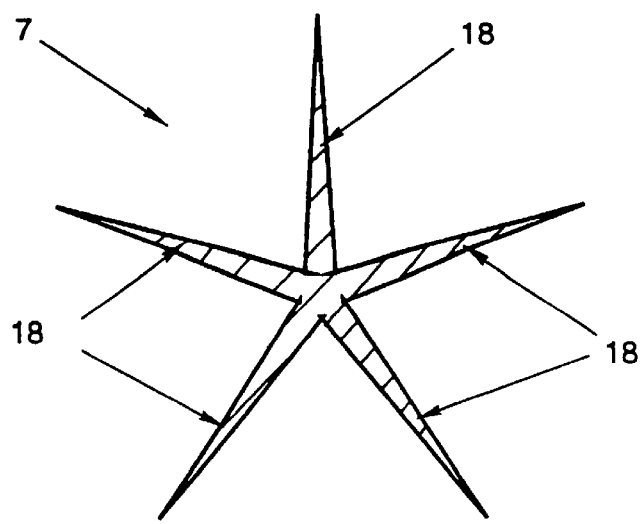

It will be appreciated that other configurations for the blade assembly are possible. FIGS. 9, 10 and 11 illustrate variations of blade array cross-sections. FIG. 9 shows a configuration of three symmetrically disposed blades 18, FIG. 10 four symmetrically disposed blades 18 and FIG. 11 five symmetrically disposed blades 18.

Figure 12:
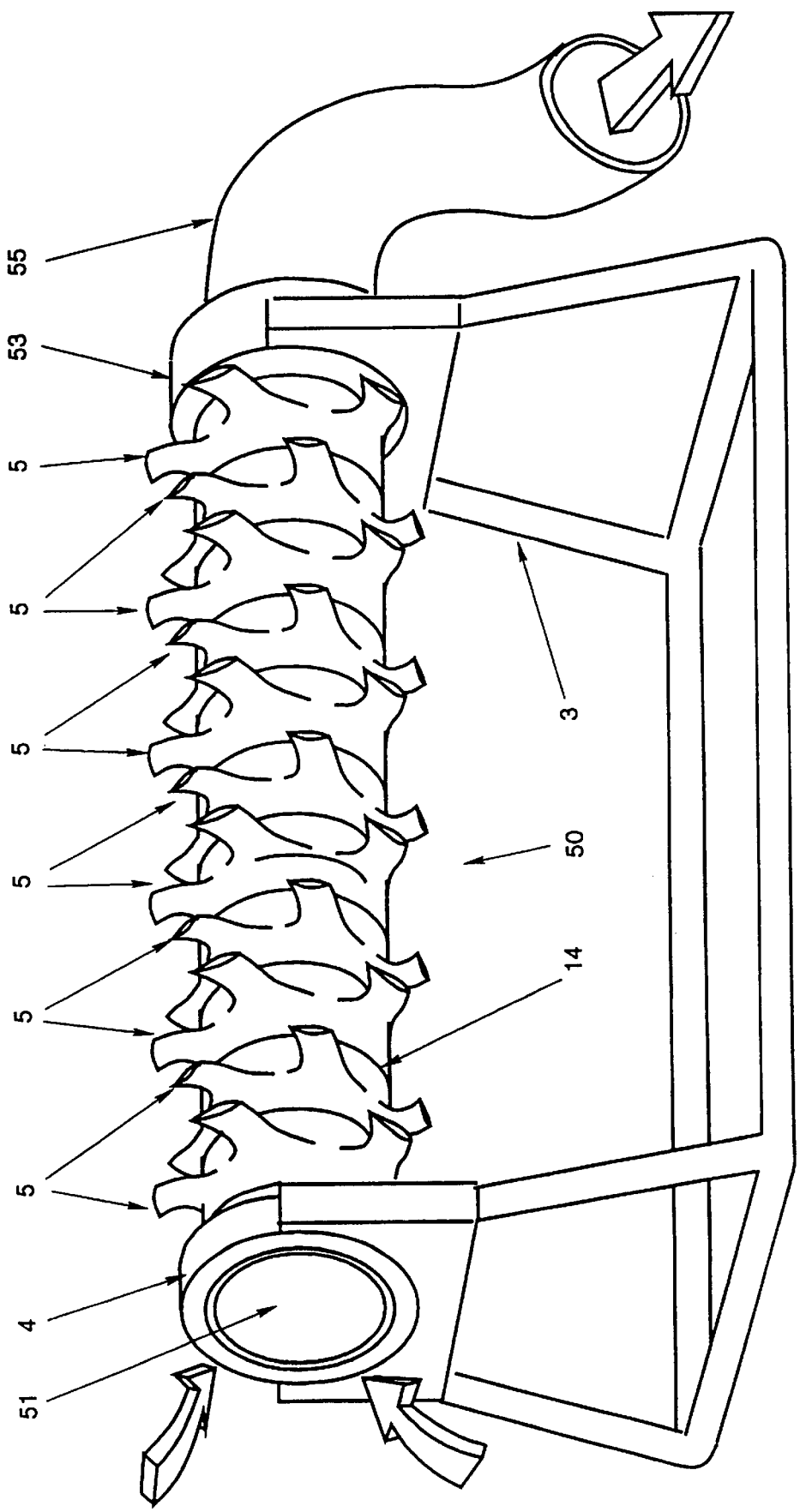
FIG. 12 is a fragmentary view of a pump constructed in accordance with the invention.

FIG. 12 diagrammatically illustrates a pump constructed in accordance with the invention. In this drawing the arms 12 are broken away for clarity of illustration. The arrangement is somewhat similar to the turbine illustrated in FIG. 1 and accordingly the same reference numerals are used to denote parts which correspond to one another.

In this arrangement, the rotor 14 is hollow and one end 51 constitutes a fluid inlet for the pump. A rotary coupling 53 is located at the other end of the rotor 14 so as to permit connection of an outlet conduit 55. A pump 50 of the type shown in FIG. 12 can be located in a moving flow of fluid such as a river or the like and used to pump water from the river for delivery through the outlet conduit 55. Typically, the pump 50 would find application where conventional forms of pumping were impractical for reasons of cost or lack of suitable power source. Further, the pump 50 would be most useful in applications where the pumping head was relatively low, say of the order of several meters. It is envisaged that the pump 50 of the invention would be particularly suitable for use in irrigation in developing countries.

Figure 13:
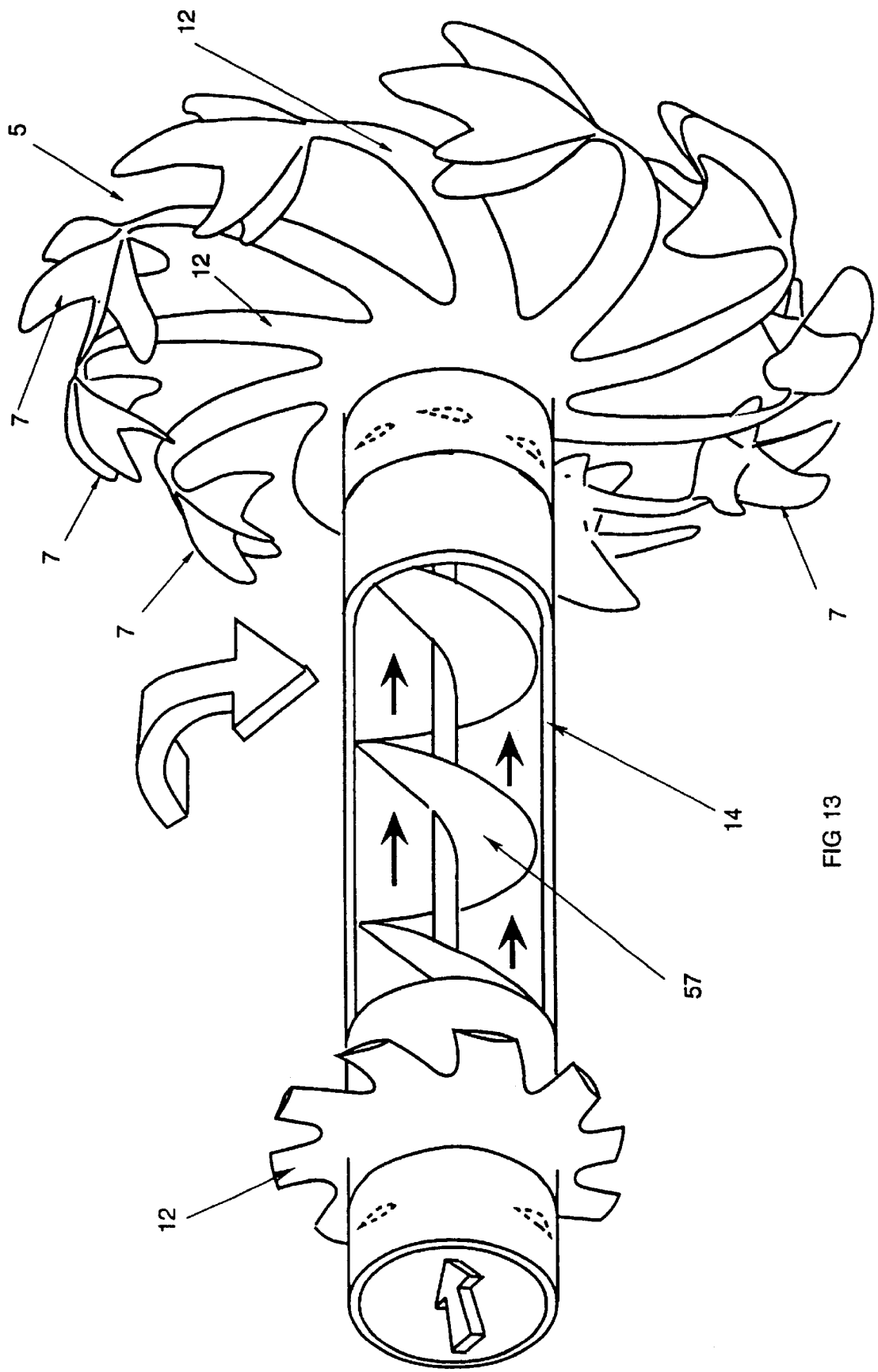
FIG. 13 is a schematic view partly in section of a pump of the invention.

FIG. 13 shows the pump with part of the rotor 14 broken away. It will be seen that a helical screw 57 extends along the hollow interior of the rotor 14. The screw 57 is mounted for rotation with the rotor 14 and thus if the rotor 14 is inclined, it will function as an archimedes screw pump. In a preferred embodiment, the screw 57 may be integrally formed in segments with the hub elements 6 which together make up the rotor 14.

FIGS. 14, 15 and 16 diagrammatically illustrate a modified form of pump which operates on a similar principle. The arrangement is such that the pumping performance is improved by minimising the tendency for solid body rotation of the fluid within the pump.

In this arrangement, a helical screw 61 is mounted within the rotor 14 but is stationary, that is to say fixed relative to the framework 3. A second helical screw 63 is formed by flights 65 which are moulded on the interior of the hub element 6. The flights 65 are arranged to form a continuous screw of opposite pitch to that of the screw 61 when the hub elements 6 are coupled together, as diagrammatically illustrated in FIG. 15. In this arrangement, the moving helical screw 63, which moves with the rotor 14, pumps water along the interior of the rotor 14 and the stationary screw 61 of opposite pitch tends to minimise the tendency for solid body rotation of the water. This improves the efficiency of the pump.

In an alternative embodiment, the screw 61 is arranged to rotate in the opposite direction to the rotation of the screw 63. There are many ways to achieve this counter rotation, for example the rotor shaft 14 could drive planetary gears (not shown).

In an alternative arrangement, the flights 65 of adjacent modules 5 could be arranged to have opposite pitches to one another and the adjacent modules themselves are arranged for rotation in opposite directions, in much the same way that arrays of turbine blades in a jet engine operate. This could be accomplished by the use of planetary gear trains or the like. The employment of geared contra-rotating spirals operating at speeds higher than the shaft rpm facilitates the use of finer pitch spirals which are thus capable of delivering a greater head of pressure.

It will be appreciated that the turbine 1 of the invention can be mounted at various attitudes with respect to the moving flow of fluid such as water or air. When harnessing energy from wave motion, it would be appropriate to mount the turbine such that the shaft is vertical or horizontal or at any other attitude. Similarly, in more uniform flows, the optimum attitude of the shaft with respect to the flow is probably inclined somewhat say at approximately 45° so as to get maximum benefit from the input of the arms.

Where the device of the invention is to be used as a power generator, the electrical components can be located within the hollow interior of the hub element 6. For instance, stator windings can be arranged to move with the hub element 6 and rotor windings can be mounted on the shaft 14. In some arrangements it may be desirable to include planetary gears which operate to produce a higher rate of rotation of the shaft so that the generator operates more efficiently.

Many modifications will be apparent to those skilled in the art without departing from the spirit and scope of the invention.

I claim:

1. An energy conversion apparatus including:

a shaft;

means for mounting the shaft for rotation about an axis;

an arm assembly being formed with or coupled to said shaft and including at least one arm; and a plurality of blades formed with or coupled to the free end of each of said at least one arm by a flexible joint;

wherein the plurality of blades are in a number of different planes, the flexible joint permitting deflection in two planes; the flexible joint being of greater width than depth, the width having a major axis and the depth having a minor axis, the flexible joint being able to flex in the direction of the minor axis, and to resist flexure in the direction of the major axis in order to transfer movement in the direction of the major axis to the arm, the flexing about the minor axis and in the arm enabling the blades to be resiliently displaced relative to the arm when located in a moving fluid whereby the blades have components of force acting thereon which tend to produce rotation of said shaft.

2. Apparatus as claimed in claim 1, wherein said plurality of blades are integrally formed with the arms and the flexible joint.

3. Apparatus as claimed in claim 1, wherein a group of said plurality of blades is mounted on the free ends of each of the arms.

4. Apparatus as claimed in claim 3, wherein said plurality of blades are joined along their inner edges, the inner edges being transverse to said axis.

5. Apparatus as claimed in claim 1, wherein one or more of said plurality of blades are disposed in planes which are inclined relative to the plane of the arms.

6. Apparatus as claimed in claim 5, wherein there are three, four or five blades in each group.

7. Apparatus as claimed in any one of the preceding claims, wherein each arm has an aero-foil shape in transverse cross-section.

8. Apparatus as claimed in any one of claims 1–6, wherein the inner ends of the arms are connected to a hub element.

9. Apparatus as claimed in claim 8, including means for interconnecting a plurality of said hub elements together to form said shaft.

10. Apparatus as claimed in claim 1, wherein each of said plurality of blades has an aero-foil shape in transverse cross-section.

11. Apparatus as claimed in claim 10, wherein said at least one arm is swept rearwardly relative to the direction of rotation of the shaft.

12. Apparatus as claimed in claim 11, wherein a leading edge of said at least one arm is swept rearwardly relative to the direction of rotation of the shaft.

13. Apparatus as claimed in claim 1, wherein the flexible joint is of maximum thickness at a point forward of the center of lateral resistance of the flexible joint.

14. Apparatus as claimed in claim 13, wherein the flexible joint is of symmetrical configuration.

15. A turbine module for extracting energy from moving fluid including one or more hub elements, a plurality of arms radiating from each hub element and disposed in a plane, a plurality of blades formed with or coupled to the free ends of each of the arms by a flexible joint, one or more of the blades being in planes which are inclined relative to the plane of the arms; and wherein each arm is able to deflect in one plane and the flexible joint in another plane such that the blades can be resiliently displaced relative to the arms when located in a moving fluid; and whereby the blades have components of force acting thereon which tend to produce rotation of a shaft, wherein a plurality of modules can be coupled together to form a turbine which rotates about an axis common to said one or more hub elements.

16. A module as claimed in claim 15, wherein said module is integrally molded from a semi-rigid plastics material.

17. A pump including apparatus as claimed in claim 1, wherein said shaft is hollow and an Archimedes screw is located within the hollow shaft.

18. A generator including apparatus as claimed in claim 1, wherein said shaft is hollow and a generator is located within the hollow shaft.

* * * * *